M. C. HORINE.
CUSHIONED SEAT.
APPLICATION FILED DEC. 27, 1920.

1,376,382. Patented Apr. 26, 1921.

INVENTOR
Merrill C. Horine
BY Redding & Greeley
his ATTORNEYS

UNITED STATES PATENT OFFICE.

MERRILL C. HORINE, OF NEW YORK, N. Y., ASSIGNOR TO INTERNATIONAL MOTOR COMPANY, OF NEW YORK, N. Y., A CORPORATION OF DELAWARE.

CUSHIONED SEAT.

1,376,382.  Specification of Letters Patent.  Patented Apr. 26, 1921.

Application filed December 27, 1920. Serial No. 433,134.

*To all whom it may concern:*

Be it known that I, MERRILL C. HORINE, a citizen of the United States, residing in the borough of Manhattan of the city of New York, in the State of New York, have invented certain new and useful Improvements in Cushioned Seats, of which the following is a specification, reference being had to the accompanying drawing, forming a part hereof.

This invention relates to a seat having a cushion at the bottom and a cushion at the back for the comfort of the occupant, and is concerned particularly with an improved seat of this character adapted for use in motor vehicles. In motor vehicles where it is desirable to have deep springy seats and where excessive vibrations and vertical movements are impressed on the occupant, it is a constant source of annoyance, physical discomfort and injury to clothing, to have the bottom of the seat move relatively to the back. Such a movement means that the occupant constantly moves with relation to the cushion at the back, since this cushion is disposed in a substantially vertical plane with no capacity for movement. The principal object of the present invention is to provide a cushioned seat having a bottom and a back of the generally accepted types, but so constructed and interrelated as to cause the back to follow the movements of the bottom cushion in unison, and substantially in extent. With the back cushion having such movements, it will be evident that neither the occupant nor his clothing is given an up and down movement with relation to the back, but every movement of the occupant on the bottom cushion is accompanied by a corresponding movement of the back cushion. A further object of the invention is to provide in a cushioned seat of the character described a simple and inexpensive construction whereby the broad objects of the invention may be realized with minimum expense. In accordance with the invention it is proposed to associate with the bottom cushion means which move therewith and which transmit their movement directly to the back cushion. Such means in the illustrated embodiment comprise pivoted arms, the free ends of which are connected to the back cushion and with which are carried plungers to engage the bottom cushion and move therewith. Reference is now to be had to the accompanying drawing for a detailed description of an illustrative embodiment of the invention, in which—

The frame $a$ of the improved seat is provided with a horizontal support $b$ for springs $c$ on which rests the bottom cushion $d$ while the back of the frame $a$ affords seats for springs $e$ which lie under the back cushion $f$. With such a seat it is evident that an occupant will sink down with the bottom cushion $d$ while the back cushion remains stationary. This naturally causes some annoyance and injury to the clothing, and when these relative movements are quite frequent, as is necessarily the case in a motor car, the problem becomes of sufficient importance to seek their elimination. In accordance with the illustrated embodiment the back cushion $f$ and springs $e$ are secured to side straps $g$ anchored at their upper ends to the seat frame $a$ and spaced at suitable intervals to insure uniform downward movement of the back cushion $f$ in a manner which will later appear. The lower ends of these straps $g$ may be secured to a cross bar $h$ with which engage several pivoted arms $i$ supported at their forward ends by pivot pins $i'$ which may be journaled in brackets $i^2$ secured to the seat frame $a$. For convenience in assembling, the rear ends of the arms $i$ are formed with hooks adapted to rest loosely over the bar $h$. To the arms $i$, preferably nearer to their rear ends, are pivoted a plurality of vertical plungers $k$ carrying at their upper ends seats $k'$ which engage the underside of the bottom cushion $d$ and afford a large bearing area therefor. These plungers $k$ preferably extend up through some of the springs $c$, although it will be evident that the precise relation of parts described need not be employed since other means for transmitting movements of the bottom cushion to the back cushion might be devised by skilled mechanics.

Figure 1:
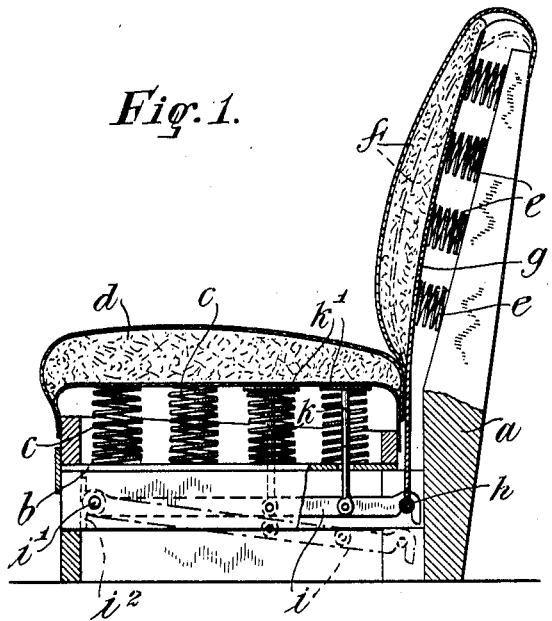
Figure 1 is a view in transverse section through a seat embodying the improvements.
Figure 2:
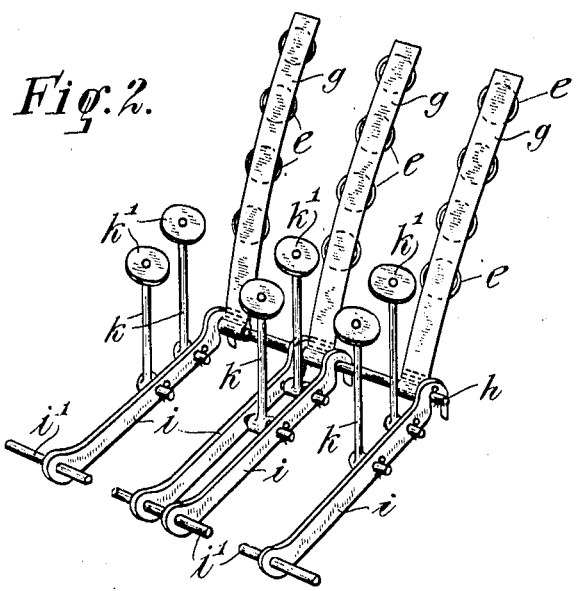
Fig. 2 is a view in perspective of the selected means for practising the improvement and disassociated from the bottom and back cushion.

From the description given it will be evident that depression of the bottom cushion $d$ will cause corresponding depression of the plungers $k$ engaged thereby. These plungers move the arms $i$ on which they are supported in proportion to the extent of movement of the part of the cushion overlying the respective plungers and arms, and the straps $g$ are drawn downwardly to an extent proportionate to the extent of movement of that part of the cushion $d$ which is in line with the respective straps. Free downward movement of the back cushion $f$ under the influence of the straps $g$ is accompanied by some movement of the springs $e$ about their seats and while it is proposed in the illustrated embodiment to have these springs bend laterally on their axes and return to normal position under their own tension, it is evident that other ways of facilitating lateral movement of such springs might be provided. As shown in Fig. 1 by dotted lines the back cushion $f$ can be drawn down quite an appreciable distance upon depression of one or more of the arms $i$ by the bottom cushion $d$. The back cushion $f$ will always move in unison with and proportionately to the movement of the occupant and his clothing so that the annoying relative movements now generally experienced will be entirely eliminated.

I claim as my invention:

1. A seat comprising a bottom cushion, a back cushion independent thereof and pivoted arms mounted under the bottom cushion and engaged operatively thereby, and means to connect said arms with the back cushion to impress the movements of the bottom cushion on the back cushion.

2. A seat comprising a bottom cushion, a back cushion, pivoted arms mounted under the bottom cushion, plungers carried on the arms and engaged by the bottom cushion and means connecting the arms with the back cushion to transmit movements of the bottom cushion to the back cushion.

3. A seat having a frame, a bottom cushion and a back cushion, springs interposed between said frame and the respective cushions and movable with the respective cushions, pivoted arms supported on the frame under the bottom cushion, plungers pivoted to said arms and engaging the bottom cushion, and straps secured to the back cushion and operatively connected with said arms whereby the movements of the bottom cushion are transmitted to the back cushion.

4. A seat having a bottom cushion and a back cushion, a plurality of pivoted arms spaced laterally under said bottom cushion, a plurality of straps secured to said back cushion and spaced laterally generally in line with the respective arms, a plurality of plungers pivoted to the respective arms and engaging the bottom cushion at spaced intervals and means connecting the respective straps flexibly with the respective arms and plungers whereby movements of any part of the bottom cushion cause movements of the corresponding portion of the back cushion.

This specification signed this 21 day of December, A. D. 1920.

MERRILL C. HORINE.